(12) United States Patent
Kawamura et al.

(10) Patent No.: US 8,080,476 B2
(45) Date of Patent: Dec. 20, 2011

(54) POLISHING COMPOSITION AND POLISHING PROCESS

(75) Inventors: Atsunori Kawamura, Kiyosu (JP); Masayuki Hattori, Kiyosu (JP)

(73) Assignee: Fujimi Incorporated, Kiyosu-shi (JP)

( * ) Notice: Subject to any disclaimer, the term of this patent is extended or adjusted under 35 U.S.C. 154(b) by 411 days.

(21) Appl. No.: 11/832,403

(22) Filed: Aug. 1, 2007

(65) Prior Publication Data
US 2008/0032505 A1 Feb. 7, 2008

(30) Foreign Application Priority Data

Aug. 2, 2006 (JP) ................................. 2006-211453
Aug. 2, 2006 (JP) ................................. 2006-211454

(51) Int. Cl.
*H01L 21/302* (2006.01)
*H01L 21/461* (2006.01)
*H01L 21/311* (2006.01)
*B24D 3/02* (2006.01)
*C09C 1/68* (2006.01)
*C09K 3/14* (2006.01)
*C09G 1/02* (2006.01)

(52) U.S. Cl. ........ 438/693; 438/690; 438/691; 438/692; 438/694; 51/307; 106/3

(58) Field of Classification Search ............ 51/307–309; 106/3; 438/690–694
See application file for complete search history.

(56) References Cited

U.S. PATENT DOCUMENTS

| | | | |
|---|---|---|---|
| 5,391,258 A | 2/1995 | Brancaleoni et al. | |
| 5,428,721 A | 6/1995 | Sato et al. | |
| 5,476,606 A | 12/1995 | Brancaleoni et al. | |
| 5,575,885 A | 11/1996 | Hirabayashi et al. | |
| 5,770,095 A | 6/1998 | Sasaki et al. | |
| 5,858,813 A | 1/1999 | Scherber et al. | |
| 5,954,997 A | 9/1999 | Kaufman et al. | |
| 6,126,853 A | 10/2000 | Kaufman et al. | |
| 6,423,678 B1* | 7/2002 | Brumbaugh et al. | 510/424 |
| 6,428,721 B1 | 8/2002 | Ina et al. | |
| 6,432,828 B2 | 8/2002 | Kaufman et al. | |
| 6,440,186 B1 | 8/2002 | Sakai et al. | |
| 6,479,442 B1* | 11/2002 | Berube et al. | 510/159 |
| 6,568,996 B2 | 5/2003 | Kobayashi et al. | |
| 6,679,929 B2 | 1/2004 | Asano et al. | |
| 6,689,692 B1 | 2/2004 | Grover et al. | |
| 6,773,476 B2 | 8/2004 | Sakai et al. | |
| 6,814,767 B2 | 11/2004 | Hirano | |
| 6,838,016 B2 | 1/2005 | Sakai et al. | |
| 6,936,543 B2* | 8/2005 | Schroeder et al. | 438/692 |
| 7,208,049 B2* | 4/2007 | Zhang et al. | 134/3 |
| 2003/0166337 A1 | 9/2003 | Wang et al. | |
| 2003/0219982 A1 | 11/2003 | Kurata et al. | |
| 2004/0084414 A1 | 5/2004 | Sakai et al. | |
| 2004/0144755 A1* | 7/2004 | Motonari et al. | 216/88 |
| 2004/0148867 A1* | 8/2004 | Matsumi | 51/298 |
| 2005/0108949 A1 | 5/2005 | Matsuda et al. | |
| 2006/0060974 A1 | 3/2006 | Hirano et al. | |
| 2007/0010411 A1* | 1/2007 | Amemiya et al. | 510/175 |

FOREIGN PATENT DOCUMENTS

| | | |
|---|---|---|
| EP | 1 137 056 A1 | 9/2001 |
| EP | 1 150 341 A1 | 10/2001 |
| EP | 1 211 717 A1 | 6/2002 |
| EP | 1 223 609 A1 | 7/2002 |
| EP | 1 479 741 A2 | 11/2004 |
| EP | 1 479 741 A3 | 11/2004 |
| JP | 05001299 * | 1/1993 |
| JP | 11-21546 | 1/1999 |
| JP | 2002-256256 | 9/2002 |
| JP | 2004-134751 | 4/2004 |
| WO | WO 00/13217 A1 | 3/2000 |
| WO | WO 00/39844 A1 | 7/2000 |
| WO | WO 01/13417 A1 | 2/2001 |
| WO | WO 01/17006 A1 | 3/2001 |
| WO | WO 03/020839 A1 | 3/2003 |
| WO | WO 03/104350 A1 | 12/2003 |
| WO | WO 2005/086213 A1 | 9/2005 |

OTHER PUBLICATIONS

U.S. Appl. No. 12/340,971, filed Dec. 22, 2008, Hirano, et al.
U.S. Appl. No. 12/341,241, filed Dec. 22, 2008, Hirano, et al.

* cited by examiner

*Primary Examiner* — Anthony Green
*Assistant Examiner* — Pegah Parvini
(74) *Attorney, Agent, or Firm* — Oblon, Spivak, McClelland, Maier & Neustadt, L.L.P.

(57) ABSTRACT

To provide a polishing composition particularly useful for an application to polish a conductor layer made of copper in a semiconductor wiring process, and a polishing process employing it.

Figure 1A:
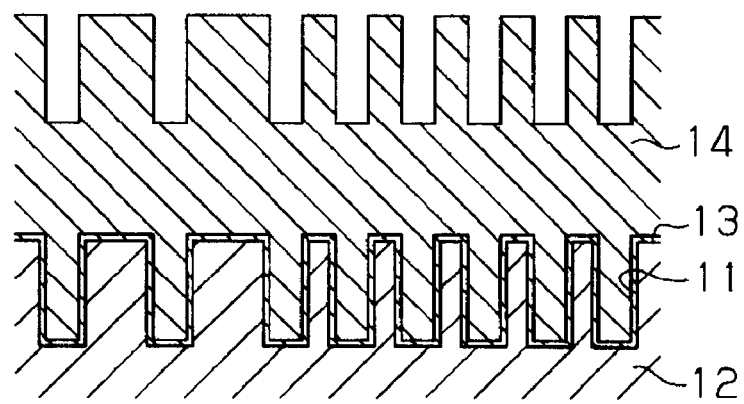

A polishing composition comprising an anionic surfactant and a nonionic surfactant, characterized in that the composition is prepared so that the water contact angle of the surface of an object to be polished, after being polished by the composition, would be at most 60°. Particularly, a polishing composition having a pH of from 2 to 9 and comprising at least one anionic surfactant represented by the chemical formula $R1-Y1'$ or $R1-X1-Y1'$, wherein R1 is an alkyl group, an alkylphenyl group or an alkenyl group, X1 is a polyoxyethylene group, a polyoxypropylene group or a poly(oxyethylene-oxypropylene) group, and Y1' is a $SO_3M1$ group or a $SO_4M1$, wherein M1 is a counter ion, a protection film forming agent different from the anionic surfactant, and at least one nonionic surfactant represented by the chemical formula $R2-X2$, wherein R2 is an alkyl group, and X2 is a polyoxyethylene group, a polyoxypropylene group or a poly(oxyethylene-oxypropylene) group, and having a HLB value of from 10 to 16.

13 Claims, 2 Drawing Sheets

POLISHING COMPOSITION AND POLISHING PROCESS

The present invention relates to a polishing composition useful for an application to polish a conductor layer made of copper in a semiconductor wiring process, and a polishing process employing it.

In a semiconductor wiring process, it is common firstly to form a barrier layer and a conductor layer sequentially on an insulator layer having trenches. Then, by chemical mechanical polishing, at least a portion of the conductor layer located out of trenches (an outside portion of the conductor layer) and a portion of the barrier layer located out of the trenches (an outside portion of the barrier layer) are removed. Patent Documents 1 to 4 disclose polishing compositions useful for polishing to remove the outside portion of the conductor layer when the conductor layer is made of copper.

The polishing composition of Patent Document 1 comprises a polyether type nonionic surfactant having a HLB value of from 3 to 9, a polyether type nonionic surfactant having a HLB value of from 10 to 20 and abrasive grains. The polishing composition of Patent Document 2 comprises a tetrazole compound, an acid such as glycine and an oxidizing agent and may further contain a water soluble polymer or surfactant, as the case requires.

The polishing composition of Patent Document 3 comprises a compound having a heterocyclic such as quinaldic acid or benzotriazole, a surfactant such as a sulfonate (an anionic surfactant), an oxidizing agent such as ammonium persulfate or hydrogen peroxide, and abrasive grains such as silica. The polishing composition of Patent Document 4 comprises a compound having a heterocyclic such as quinaldic acid or benzotriazole, a surfactant having a triple bond such as acetylene glycol (a nonionic surfactant), an oxidizing agent such as ammonium persulfate or hydrogen peroxide, and abrasive grains such as silica, and may further contain ammonium dodecylbenzene sulfonate (an anionic surfactant) as the case requires.

A polishing composition to be used for polishing to remove the outside portion of the conductor layer, is required to have at least the following two performances.

(1) To suppress a phenomenon so-called dishing wherein the level of the upper surface of the conductor layer lowers as the portion of the conductor layer located in the trenches (the inside portion of the conductor layer) is removed.

(2) The stock removal rate of the conductive layer by the polishing composition is high, i.e. the removal rate of the conductor layer by the polishing composition is high.

However, the polishing compositions disclosed in Patent Documents 1 to 4 do not fully satisfy such required performances and still have rooms for improvements.

Patent Document 1: JP-A-2006-49709
Patent Document 2: JP-A-2006-49790
Patent Document 3: JP-A-2002-12854
Patent Document 4: JP-A-2002-256256

It is an object of the present invention to provide a polishing composition which is particularly useful for an application to polish a conductor layer made of copper in a semiconductor wiring process, and a polishing process employing it.

To accomplish the above object, the present invention provides the following:

1. A polishing composition comprising an anionic surfactant and a nonionic surfactant, characterized in that the composition is prepared so that the water contact angle of the surface of an object to be polished, after being polished by the composition, would be at most 60°.

2. The polishing composition according to the above 1, wherein the anionic surfactant contains at least one compound represented by the chemical formula R1-Y1 or R1-X1-Y1, wherein R1 is an alkyl group, an alkylphenyl group or an alkenyl group, X1 is a polyoxyethylene group, a polyoxypropylene group or a poly(oxyethylene-oxypropylene) group, and Y1 is an anionic functional group.

3. The polishing composition according to the above 2, wherein Y1 in the anionic surfactant is a residue of a carboxylic acid, phosphoric acid, phosphorous acid, sulfuric acid, sulfurous acid or a salt thereof.

4. The polishing composition according to any one of the above 1 to 3, wherein the nonionic surfactant contains at least one compound represented by the chemical formula R2-X2, wherein R2 is an alkyl group, and X2 is a polyoxyethylene group, a polyoxypropylene group or a poly(oxyethylene-oxypropylene) group, and having a HLB value of from 10 to 16.

5. A process for polishing an object to be polished, comprising an insulator layer having trenches, and a conductive layer made of copper formed on the insulator layer, said conductive layer having an outside portion located out of the trenches and an inside portion located in the trenches, which process comprises a step of removing the majority of the outside portion of the conductor layer by polishing by means of a preliminary polishing composition, and a step of removing the rest of the outside portion of the conductor layer by polishing by means of the polishing composition as defined in any one of the above 1 to 4, as a finish polishing composition different from the preliminary polishing composition.

6. A polishing composition having a pH of from 2 to 9 and comprising at least one anionic surfactant represented by the chemical formula R1-Y1' or R1-X1-Y1', wherein R1 is an alkyl group, an alkylphenyl group or an alkenyl group, X1 is a polyoxyethylene group, a polyoxypropylene group or a poly(oxyethylene-oxypropylene) group, and Y1' is a $SO_3M1$ group or a $SO_4M1$, wherein M1 is a counter ion, a protection film forming agent different from the anionic surfactant, and at least one nonionic surfactant represented by the chemical formula R2-X2, wherein R2 is an alkyl group, and X2 is a polyoxyethylene group, a polyoxypropylene group or a poly(oxyethylene-oxypropylene) group, and having a HLB value of from 10 to 16.

7. The polishing composition according to the above 6, wherein the average number of repeating units in the polyoxyethylene group, the polyoxypropylene group or the poly(oxyethylene-oxypropylene) group in the nonionic surfactant is from 2 to 20.

8. The polishing composition according to the above 6 or 7, wherein the average number of repeating units in the polyoxyethylene group, the polyoxypropylene group or the poly(oxyethylene-oxypropylene) group in the anionic surfactant is at most 6.

9. The polishing composition according to any one of the above 6 to 8, wherein M1 in the anionic surfactant is a potassium cation, an ammonium cation or an amine cation.

10. A process for polishing an object to be polished, comprising an insulator layer having trenches, and a conductive layer made of copper formed on the insulator layer, said conductive layer having an outside portion located out of the trenches and an inside portion located in the trenches, which process comprises a step of removing the majority of the outside portion of the conductor layer by polishing by means of a preliminary polishing composition, and a step of removing the rest of the outside portion of the conductor layer by polishing by means of the polishing composition as defined in any one of the above 6 to 9, as a finish polishing composition different from the preliminary polishing composition.

According to the present invention, a polishing composition particularly useful for an application to polish a conductive layer made of copper in a semiconductor wiring process, and a polishing process employing it, are provided.

In the accompanying drawings:

FIGS. 1(a) to 1(d) are cross-sectional views of an object to be polished, to illustrate a semiconductor wiring process.

Figure 2:
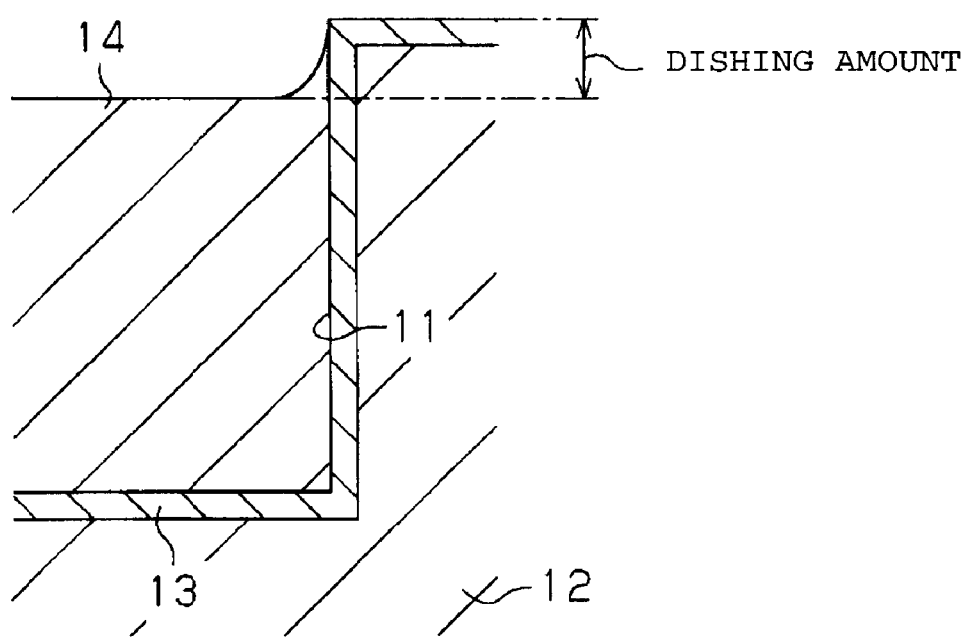

FIG. 2 is a cross-sectional view of an object to be polished, to illustrate dishing.

In the drawings, reference numeral 11 represents a trench, 12 an insulator layer, and 14 a conductor layer.

Now, the present invention will be described in detail with reference to preferred embodiments.

Firstly, the semiconductor wiring process will be described with reference to FIGS. 1(a) to 1(d). The semiconductor wiring process usually comprises the following steps.

Firstly, as shown in FIG. 1(a), a barrier layer 13 and a conductive layer 14 are sequentially formed on an insulator layer 12 having trenches 11, formed on a semiconductor substrate (not shown). Prior to formation of the conductor layer 14, the barrier layer 13 is formed on the insulator layer 12 to cover the surface of the insulator layer 12. The thickness of the barrier layer 13 is less than the depth of the trenches 11. Following the formation of the barrier layer 13, the conductor layer 14 is formed on the barrier layer 13 at least to embed the trenches 11.

Thereafter, by chemical mechanical polishing, at least a portion of the conductor layer 14 located out of the trenches 11 (the outside portion of the conductor layer 14) and a portion of the barrier layer 13 located out of the trenches 11 (the outside portion of the barrier layer 13) are removed. As a result, as shown in FIG. 1(d), at least a part of a portion of the barrier layer 13 located in the trenches 11 (the inside portion of the barrier layer 13) and at least a part of a portion of the conductor layer 14 located in the trenches 11 (the inside portion of the conductor layer 14) will remain on the insulator layer 12. Namely, a part of the barrier layer 13 and a part of the conductor layer 14 will remain inside the trenches 11. Thus, the portion of the conductor layer 14 remaining inside the trenches 11 will function as a wiring.

Figure 1B:
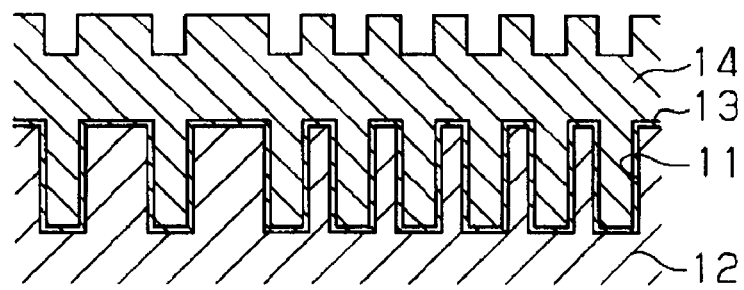
Figure 1C:
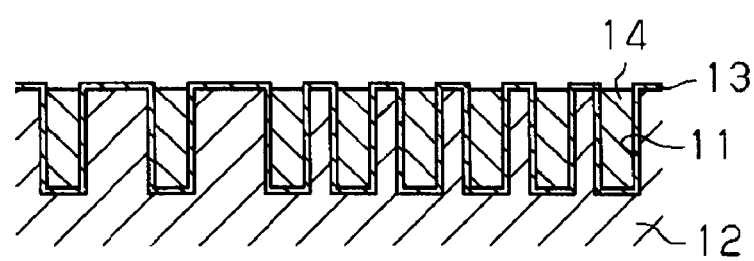
Figure 1D:
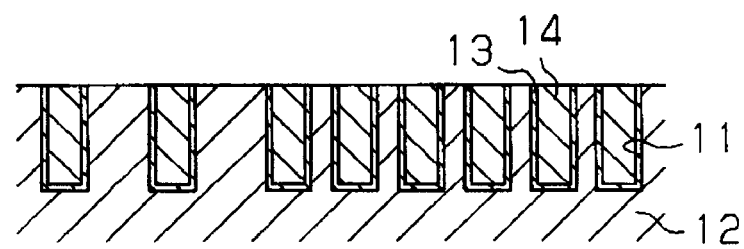

In a case where by chemical mechanical polishing, at least the outside portion of the conductor layer 14 and the outside portion of the barrier layer 13 are to be removed, firstly the majority of the outside portion of the conductor layer 14 is removed as shown in FIG. 1(b). Then, as shown in FIG. 1(c), the rest of the outside portion of the conductor layer 14 is removed to expose the upper surface of the outside portion of the barrier layer 13. Thereafter, as shown in FIG. 1(d), the outside portion of the barrier layer 13 is removed to expose the upper surface of the insulator layer 12 and to obtain a flat surface at the same time.

The polishing composition of the present invention is useful for polishing the conductor layer 14 in such a semiconductor wiring process in a case where the conductor layer 14 is made of copper. More specifically, it is particularly suitable for use in polishing the rest of the outside portion of the conductor layer 14 after the majority of the outside portion of the conductor layer 14 has been removed.

The polishing composition according to the first embodiment of the present invention is prepared by mixing predetermined amounts of an anionic surfactant and a nonionic surfactant with water so that the water contact angle of the surface of an object to be polished, after being polished by means of the polishing composition, would be at most 60°, preferably at most 45°, more preferably at most 30°.

The anionic surfactant contained in the polishing composition of the first embodiment has a function to be electrically adsorbed on the surface of the conductor layer 14 in a pH range of from neutral to acidic to form a protecting film. In the pH range of from neutral to acidic, the surface potential of the conductor layer 14 made of copper is positive. Therefore, an anion group as a hydrophilic portion of the anionic surfactant will be bonded to the surface of the conductor layer 14, and a hydrophobic portion of the anionic surfactant will be located at the side opposite to the surface of the conductor layer 14. Accordingly, the surface of the protection film by such an anionic surfactant has hydrophobicity. Once a protection film by the anionic surfactant is formed on the surface of the conductor layer 14, the affinity between the abrasive grains and the surface of the conductor layer 14 decreases, and the stock removal rate of the conductor layer 14 by the polishing composition decreases. As a result, excessive removal of the inside portion of the conductor layer 14 will be suppressed, and dishing (see FIG. 2) will be suppressed.

The anionic surfactant contained in the polishing composition preferably contains at least one compound represented by the chemical formula R1-Y1 or R1-X1-Y1, wherein R1 is an alkyl group, an alkylphenyl group or an alkenyl group, X1 is a polyoxyethylene group, a polyoxypropylene group or a poly(oxyethylene-oxypropylene) group, and Y1 is an anionic functional group. The anionic functional group for Y1 is preferably a residue of a carboxylic acid, phosphoric acid, phosphorus acid, sulfuric acid, sulfurous acid or a salt thereof. The counter ion contained in the anionic functional group is not particularly limited and may, for example, be an ammonium cation, an amine cation or an alkali metal cation such as a lithium cation, a sodium cation or a potassium cation. Among them, with a view to improving the stock removal rate of the conductor layer 14 by the polishing composition, preferred is a potassium cation, an ammonium cation or an amine cation, more preferred is an ammonium cation or a triethanolamine cation, and most preferred is an ammonium cation.

The content of the anionic surfactant in the polishing composition has a close relation with the suppression of dishing and the stock removal rate. If it is too small, no adequate protection film to strongly suppress excessive polishing of the conductor layer 14 will be formed on the surface of the conductor layer 14, whereby dishing may not be sufficiently suppressed. With a view to suppressing the dishing more strongly, the content of the anionic surfactant in the polishing composition is preferably at least 0.01 g/L, more preferably at least 0.03 g/L, more preferably at least 0.05 g/L, further preferably at least 0.08 g/L, most preferably at least 0.1 g/L. On the other hand, if the content of the anionic surfactant in the polishing composition is too large, the protection film will be excessively formed on the surface of the conductor layer 14, whereby polishing of the conductor layer 14 will be suppressed too much. In order to maintain the stock removal rate of the conductor layer 14 by the polishing composition to be high, the content of the anionic surfactant in the polishing composition is preferably at most 10 g/L, more preferably at most 5 g/L, further preferably at most 1 g/L, still further preferably at most 0.5 g/L, most preferably at most 0.3 g/L.

When the anionic surfactant contained in the polishing composition contains a compound represented by the chemical formula R1-X1-Y1, the average number of repeating units in X1 has a close relation with the metal corrosion at the wiring edge portion in the conductor layer 14. If it is too large, metal corrosion so-called slit is likely to occur at the wiring edge portion. With a view to suppressing metal corrosion at the wiring edge portion, the average number of repeating units in X1 is preferably at most 6, more preferably at most 4, most preferably at most 2.

The nonionic surfactant contained in the polishing composition of this embodiment has a function to be adsorbed on the hydrophobic surface of the protection film by the above anionic surfactant to form a protection film. The hydrophobic portion of the nonionic surfactant will bond to the hydrophobic surface of the protection film by the anionic surfactant, and the hydrophilic portion of the nonionic surfactant will be located on the side opposite to the hydrophobic surface of the protection film by the anionic surfactant. Therefore, the surface of the protection film by the nonionic surfactant formed on the hydrophobic surface of the protective film by the anionic surfactant has hydrophilicity. Once the protection film by the nonionic surfactant is formed on the hydrophobic surface of the protection film by the anionic surfactant, the affinity between the abrasive grains and the surface of the conductor layer 14 will be improved, whereby the stock removal rate of the conductor layer 14 by the polishing composition will be improved. As a result, an excessive decrease of the stock removal rate of the conductor layer 14 by the polishing composition due to the use of the above anionic surfactant will be suppressed.

The nonionic surfactant contained in the polishing composition preferably contains at least one compound represented by the chemical formula R2-X2 and having a HLB value of from 10 to 16. Here, R2 is an alkyl group, and X2 is a polyoxyethylene group, a polyoxypropylene group or a poly (oxyethylene-oxypropylene) group, and Y1 is an anionic functional group. X2 is preferably a polyoxyethylene group. Namely, the nonionic surfactant contained in the polishing composition preferably contains a polyoxyethylene alkyl ether.

The content of the nonionic surfactant in the polishing composition has a close relation with suppression of the decrease of the stock removal rate and suppression of dishing. If it is too small, the excessive decrease of the stock removal rate of the conductor layer 14 may not be strongly suppressed. With a view to suppressing the excessive decrease of the stock removal rate of the conductor layer 14 more strongly, the content of the nonionic surfactant in the polishing composition is preferably at least 0.01 g/L, more preferably at least 0.05 g/L, more preferably at least 0.1 g/L, most preferably at least 0.3 g/L. On the other hand, if the content of the nonionic surfactant in the polishing composition is too large, the action to suppress dishing by the anionic surfactant and the protection film-forming agent is likely to be weak, whereby dishing is likely to occur. Further, the ability of the polishing composition to polish the conductor layer 14 may rather decrease. With a view to suppressing dishing more strongly, the content of the nonionic surfactant in the polishing composition is preferably at most 20 g/L, more preferably at most 10 g/L, further preferably at most 5 g/L, most preferably at most 3 g/L.

The nonionic surfactant contained in the polishing composition of this embodiment has a physical parameter so-called a cloud point. This cloud point has a close relation with the intensity of the corrosive action of the polishing composition. If the cloud point of the nonionic surfactant contained in the polishing composition is too high, the corrosive action of the polishing composition is likely to be excessively intensified. With a view to inhibiting the excessive increase of the corrosive action of the polishing composition, the cloud point of the nonionic surfactant contained in the polishing composition is preferably at most 90° C., more preferably at most 50° C., most preferably at most 35° C.

The average number of repeating units in X2 in the nonionic surfactant contained in the polishing composition, has a close relation with the solubility of the nonionic surfactant in water. If it is too small, the nonionic surfactant tends to be hardly soluble in water. With a view to increasing the solubility of the nonionic surfactant in water, the average number of repeating units in X2 is preferably at least 2, more preferably at least 3. On the other hand, if the average number of repeating units in X2 in the nonionic surfactant contained in the polishing composition is too large, metal corrosion is likely to occur at the wiring edge portion in the conductor layer 14. With a view to suppressing metal corrosion at the wiring edge portion, the average number of repeating units in X2 is preferably at most 20, more preferably at most 15, most preferably at most 10.

The HLB value of the nonionic surfactant contained in the polishing composition has a close relation with suppression of the decrease of the stock removal rate and suppression of dishing. If it is too low, the excessive decrease of the stock removal rate of the conductor layer 14 may not so strongly be suppressed. With a view to suppressing the excessive decrease of the stock removal rate of the conductor layer 14 more strongly, the HLB value of the nonionic surfactant contained in the polishing composition is preferably at least 10, more preferably at least 10.5, further preferably at least 11, most preferably at least 11.5. On the other hand, if the HLB value of the nonionic surfactant contained in the polishing composition is too high, the action to suppress dishing by the anionic surfactant and the protection film-forming agent is likely to be weak, whereby dishing is likely to occur. With a view to suppressing dishing more strongly, the HLB value of the nonionic surfactant in the polishing composition is preferably at most 16, more preferably at most 15, further preferably at most 14, most preferably at most 13.5. Here, the HLB value of the nonionic surfactant may be obtained, for example, by a Griffin method.

The polishing composition of this embodiment preferably further contains a protection film-forming agent. The protection film-forming agent has a function to be absorbed on the surface of the conductor layer 14 to form a protection film. The surface of this protection film by this protection film-forming agent has hydrophobicity. Once the protection film by the protection film-forming agent is formed on the surface of the conductor layer 14, the affinity between the abrasive grains and the surface of the conductor layer 14 decreases, and the stock removal rate of the conductor layer 14 by the polishing composition decreases. As a result, excessive removal of the inside portion of the conductor layer 14 will be suppressed, whereby dishing will be suppressed.

The protection film-forming agent contained in the polishing composition may be benzotriazole or a benzotriazole derivative. The benzotriazole derivative is one having hydrogen atoms bonded to the five-membered ring of benzotriazole replaced by other atomic groups. With a view to suppressing dishing more strongly, the protection film-forming agent contained in the polishing composition is preferably benzotriazole. In the protection film by benzotriazole, the five-membered ring portion of benzotriazole is bonded to the surface of the conductor layer 14, and the benzene ring portion of benzotriazole is located at the side opposite to the surface of the conductor layer 14, and consequently, the surface has hydrophobicity. In the protection film by a benzotriazole derivative, the five-membered ring portion of the benzotriazole derivative is bonded to the surface of the conductor layer 14, and the benzene ring portion of the benzotriazole derivative is located at the side opposite to the surface of the conductor layer 14, whereby the surface has hydrophobicity.

The content of the protection film-forming agent in the polishing composition has a close relation with the stock removal rate and suppression of dishing. If it is too small, no adequate protection film to strongly suppress excessive polishing of the conductor layer 14 will be formed on the surface of the conductor layer 14, whereby dishing may not be sufficiently suppressed. With a view to suppressing dishing more strongly, the content of the protection film-forming agent in the polishing composition is preferably at least 0.001 g/L, more preferably at least 0.01 g/L. On the other hand, if the content of the protection film-forming agent in the polishing composition is too large, the protection film will be excessively formed on the surface of the conductor layer 14, whereby polishing of the conductor layer 14 tends to be excessively suppressed. In order to maintain the stock removal rate of the conductor layer 14 by the polishing composition to be high, the content of the protection film-forming agent in the polishing composition is preferably at most 1 g/L, more preferably at most 0.2 g/L.

The polishing composition of this embodiment preferably further contains an oxidizing agent. The oxidizing agent has a function to oxidize the conductor layer 14 and thus serves to improve the stock removal rate of the conductor layer 14 by the polishing composition. The oxidizing agent contained in the polishing composition may be a peroxide such as hydrogen peroxide or ammonium persulfate. With a view to reducing metal contamination of the conductor layer 14 attributable to an oxidizing agent, hydrogen peroxide is preferred.

If the content of the oxidizing agent in the polishing composition is too small, the stock removal rate of the conductor layer 14 by the polishing composition will not be substantially improved. With a view to improving the stock removal rate of the conductor layer 14 by the polishing composition substantially, the content of the oxidizing agent in the polishing composition is preferably at least 1 g/L, more preferably at least 3 g/L, most preferably at least 5 g/L. On the other hand, if the content of the oxidizing agent in the polishing composition is too large, the polishing ability of the polishing composition against the conductor layer 14 tends to be too high, whereby dishing is likely to occur. With a view to suppressing dishing more strongly, the content of the oxidizing agent in the polishing composition is preferably at most 30 g/L, more preferably at most 20 g/L, most preferably at most 15 g/L.

The polishing composition of this embodiment preferably further contains an etching agent. The etching agent has a function to etch the conductor layer 14 and serves to improve the stock removal rate of the conductor layer 14 by the polishing composition. The etching agent contained in the polishing composition may be an α-amino acid such as glycine, alanine or valine. With a view to improving the stock removal rate of the conductor layer 14 by the polishing composition more, glycine is preferred.

If the content of the etching agent in the polishing composition is too small, the stock removal rate of the conductor layer 14 by the polishing composition will not be substantially improved. With a view to improving the stock removal rate of the conductor layer 14 by the polishing composition substantially, the content of the etching agent in the polishing composition is preferably at least 0.5 g/L, more preferably at least 1 g/L, further preferably at least 3 g/L, most preferably at least 5 g/L. On the other hand, if the content of the etching agent in the polishing composition is too large, the polishing ability of the polishing composition against the conductor layer 14 tends to be too high, whereby dishing is likely to occur. With a view to suppressing dishing more strongly, the content of the etching agent in the polishing composition is preferably at most 50 g/L, more preferably at most 30 g/L, further preferably at most 20 g/L, most preferably at most 15 g/L.

The polishing composition of this embodiment preferably further contains abrasive grains. The abrasive grains play a role of mechanically polish the conductor layer 14 and serve to improve the stock removal rate of the conductor layer 14 by the polishing composition. The abrasive grains contained in the polishing composition may be silica. With a view to reducing surface defects of the conductor layer 14 after polishing, colloidal silica is preferred.

If the content of the abrasive grains in the polishing composition is too small, the stock removal rate of the conductor layer 14 by the polishing composition will not be substantially improved. With a view to improving the stock removal rate of the conductor layer 14 by the polishing composition substantially, the content of the abrasive grains in the polishing composition is preferably at least 0.5 g/L, more preferably at least 1 g/L, most preferably at least 5 g/L. On the other hand, if the content of the abrasive grains in the polishing composition is too large, the polishing ability of the polishing composition against the conductor layer 14 tends to be too high, whereby dishing is likely to occur. With a view to suppressing dishing more strongly, the content of the abrasive grains in the polishing composition is preferably at most 100 g/L, more preferably at most 50 g/L, most preferably at most 20 g/L.

If the average primary particle size of the abrasive grains contained in the polishing composition is too small, the stock removal rate of the conductor layer 14 by the polishing composition will not be substantially improved. With a view to improving the stock removal rate of the conductor layer 14 by the polishing composition substantially, the average primary particle size of the abrasive grains contained in the polishing composition is preferably at least 3 nm, more preferably at least 5 nm, most preferably at least 8 nm. On the other hand, if the average primary particle size of the abrasive grains contained in the polishing composition is too large, the abrasive grains tend to settle in the polishing composition. With a view to preventing such settlement of the abrasive grains, the average primary particle size of the abrasive grains contained in the polishing composition is preferably at most 200 nm, more preferably at most 100 nm, most preferably at most 50 nm. Here, the average primary particle size of the abrasive grains is calculated from the specific surface area of the abrasive grains, measured by a BET method.

The pH of the polishing composition of this embodiment has a close relation with the adsorption action of the anionic surfactant to the surface of the conductor layer 14. For this adsorption action to work efficiently, the pH of the polishing composition is preferably from about neutral to acidic. However, if the pH of the polishing composition is in a strongly acidic range, dishing is likely to occur. With a view to suppressing dishing more strongly, the pH of the polishing composition is preferably at least 2, more preferably at least 4, most preferably at least 6. On the other hand, if the pH of the polishing composition is in an alkaline range, decomposition of the etching agent in the polishing composition is likely to occur as the time passes, whereby the pot life of the polishing composition is likely to decrease. Further, formation of a protection film by the anionic surfactant is likely to be prevented. With a view to avoiding such adverse effects, the pH of the polishing composition is preferably at most 9, more preferably at most 8.5, most preferably at most 8.

According to this first embodiment of the present invention, the following merits can be obtained.

The polishing composition of this embodiment comprises an anionic surfactant and a nonionic surfactant so that the water contact angle of the surface of an object to be polished, after being polished by means of the polishing composition, would be at most 60°, preferably at most 45°, more preferably at most 30°. This polishing composition exhibits a performance to satisfy is both the required performance relating to dishing and the required performance relating to the stock removal rate with respect to the affinity between the surface of the object to be polished, and the abrasive grains. Accordingly, the polishing composition of this embodiment is particularly useful for an application to polish a conductor layer 14 in a semiconductor wiring process.

The above embodiment may be modified as follows.

The polishing composition of the above embodiment may be prepared by diluting a concentrated stock solution before use.

To the polishing composition of the above embodiment, known additives such as a pH-controlling agent, an antiseptic and a defoaming agent may be added, as the case requires.

Now, Examples of the first embodiment of the present invention and Comparative Examples will be described.

Polishing compositions of Examples 1 to 31 and Comparative Examples 1 to 4 were prepared by mixing an anionic surfactant, a nonionic surfactant, a protection film-forming agent, an oxidizing agent, an etching agent, abrasive grains and a pH-controlling agent with water, as the case requires. The details of the anionic surfactant, the nonionic surfactant, the protection film-forming agent, the oxidizing agent, the etching agent, the abrasive grains and the pH-controlling agent in each polishing composition, and the pH of each polishing composition are as shown in Table 1 or 2.

In the column for "water contact angle" in Tables 1 and 2, the results of measurement of water contact angles of wafer surfaces after polishing copper blanket wafers having a diameter of 200 mm under the polishing conditions shown in Table 3 by means of the polishing compositions of Examples 1 to 31 and Comparative Examples 1 to 4, are shown. The measurement of the water contact angles was carried out after rinsing with pure water the surfaces of the wafers after polishing. For the measurement of the water contact angles, wafer cleaning treatment evaluation apparatus "CA-X200", manufactured by Kyowa Interface Science Co., LTD. was used.

In the column for "stock removal rate" in Tables 4 and 5, the stock removal rate is shown which was obtained when a copper blanket wafer having a diameter of 200 mm was polished under the polishing conditions as identified in Table 3 by means of each of the polishing compositions of Examples 1 to 31 and Comparative Examples 1 to 4. The stock removal rate was obtained by dividing the difference in thickness of each wafer as between before and after the polishing by the polishing time. For the measurement of the thickness of the wafer, a sheet resistance measuring apparatus "VR-120", manufactured by Kokusai Electric System Service Co., Ltd. was used.

In the column for "dishing" in Tables 1 and 2, the results of measurement of the dishing amount of a copper pattern wafer (854 mask pattern) of SEMATEC polished by means of each of the polishing compositions of Examples 1 to 31 and Comparative Examples 1 to 4, are shown. Specifically, the copper pattern wafer of SEMATEC comprises a barrier layer made of tantalum and a conductor layer made of copper and having a thickness of 1,000 nm sequentially formed on an insulator layer made of silicon dioxide and having trenches, and has an initial concave portion with a depth of 500 nm on the upper surface. This copper pattern wafer was preliminarily polished by means of a polishing material "PLANERLITE-7105" of FUJIMI INCORPORATED under the polishing conditions as identified in Table 3 until the thickness of the conductor layer became 300 nm, before polishing by means of each of the polishing compositions of Examples 1 to 31 and Comparative Examples 1 to 4. Then, by means of each of the polishing compositions of Examples 1 to 31 and Comparative Examples 1 to 4, the copper pattern wafer after the preliminary polishing, was polished under the polishing conditions as identified in Table 3 until the upper layer of the barrier layer exposed. Thereafter, by means of a profiler "HRP340" as a contact type surface measuring apparatus of KLA-Tencor Corporation, the dishing amount was measured at an area of each wafer where a trench with a width of 100 μm was independently formed.

In the column for "pot life" in Tables 1 and 2, the results of evaluation of the pot life of each of the polishing compositions of Examples 1 to 31 and Comparative Examples 1 to 4 are shown. Specifically, using each of the polishing compositions of Examples 1 to 31 and Comparative Examples 1 to 4 immediately after the preparation and each of the polishing compositions of Examples 1 to 31 and Comparative Examples 1 to 4 after being left to stand still for 14 days in a constant temperature tank of 25° C. after the preparation, respectively, the copper blanket wafer was polished under the polishing conditions as identified in Table 3. And, the stock removal rate was calculated by dividing the difference in thickness of each wafer as between before and after the polishing by the polishing time, and the pot life of each polishing composition was evaluated, based on the comparison between the stock removal rate with the polishing composition immediately after the preparation and the stock removal rate with the polishing composition left to stand for 14 days at 25° C. In the column for "pot life", ○ (good) means that the decrease in the stock removal rate was at most 10%, and Δ (slightly poor) means that the decrease in the stock removal rate was more than 10%.

TABLE 1

| Example | Anionic surfactant Type/content (g/L) | Nonionic surfactant Type/content (g/L) | HLB value | Cloud point (° C.) | Protection film-forming agent Type/content (g/L) | Oxidizing agent Type/content (g/L) | Etching agent Type/content (g/L) | Abrasive grains Type/content (g/L) | Abrasive grains Average primary particle size (nm) | pH-controlling agent Type/content (g/L) | pH | Water contact angle | Stock removal rate (nm/min) | Dishing (nm) | Pot life |
|---|---|---|---|---|---|---|---|---|---|---|---|---|---|---|---|
| 1 | A1/0.16 | B1/0.5 | 12.8 | 32 | C1/0.05 | D1/10.2 | E1/10 | F1/10 | 30 | — | 6.7 | 18 | 735 | 66 | ○ |
| 2 | A1/0.16 | B1/1 | 12.8 | 32 | C1/0.05 | D1/10.2 | E1/10 | F1/10 | 30 | — | 6.7 | 13 | 798 | 49 | ○ |
| 3 | A1/0.16 | B1/2 | 12.8 | 32 | C1/0.05 | D1/10.2 | E1/10 | F1/10 | 30 | — | 6.7 | 21 | 801 | 47 | ○ |

TABLE 1-continued

| Example | Anionic surfactant Type/content (g/L) | Nonionic surfactant Type/content (g/L) | HLB value | Cloud point (° C.) | Protection film-forming agent Type/content (g/L) | Oxidizing agent Type/content (g/L) | Etching agent Type/content (g/L) | Abrasive grains Type/content (g/L) | Average primary particle size (nm) | pH-controlling agent Type/content (g/L) | pH | Water contact angle | Stock removal rate (nm/min) | Dishing (nm) | Pot life |
|---|---|---|---|---|---|---|---|---|---|---|---|---|---|---|---|
| 4 | A1/0.16 | B1/3 | 12.8 | 32 | C1/0.05 | D1/10.2 | E1/10 | F1/10 | 30 | — | 6.7 | 27 | 813 | 42 | ○ |
| 5 | A1/0.16 | B1/1.5 | 12.8 | 32 | C1/0.04 | D1/10.2 | E1/10 | F1/10 | 30 | — | 6.7 | 25 | 943 | 81 | ○ |
| 6 | A1/0.16 | B1/1.5 | 12.8 | 32 | C1/0.04 | D1/10.2 | E1/10 | F1/10 | 30 | — | 6.7 | 25 | 501 | 45 | ○ |
| 7 | A1/0.16 | B1/1.5 | 12.8 | 32 | C1/0.04 | D1/10.2 | E1/10 | F1/10 | 30 | — | 6.7 | 12 | 408 | 19 | ○ |
| 8 | A1/0.16 | B1/1.5 | 12.8 | 32 | C1/0.04 | D1/10.2 | E1/10 | F1/16 | 30 | — | 6.8 | 13 | 322 | 13 | ○ |
| 9 | A1/0.16 | B1/1.5 | 12.8 | 32 | C1/0.04 | D1/10.2 | E1/10 | F1/10 | 15 | — | 6.7 | 20 | 553 | 28 | ○ |
| 10 | A1/0.16 | B1/1.5 | 12.8 | 32 | C1/0.04 | D1/10.2 | E1/10 | F1/10 | 22 | — | 6.7 | 20 | 627 | 36 | ○ |
| 11 | A1/0.16 | B1/1.5 | 12.8 | 32 | C1/0.04 | D1/10.2 | E1/10 | F1/10 | 43 | — | 6.7 | 19 | 892 | 65 | ○ |
| 12 | A1/0.16 | B1/1.5 | 12.8 | 32 | C1/0.04 | D1/10.2 | E1/10 | F1/10 | 55 | — | 6.7 | 18 | 1070 | 75 | ○ |
| 13 | A1/0.16 | B1/1 | 12.8 | 32 | C1/0.05 | D1/10.2 | E1/10 | F1/10 | 30 | — | 6.7 | 14 | 700 | 49 | ○ |
| 14 | A1/0.16 | B2/0.3 | 11.5 | 24 | C1/0.05 | D1/10.2 | E1/10 | F1/10 | 30 | — | 6.7 | 12 | 530 | 48 | ○ |
| 15 | A1/0.16 | B2/1.5 | 11.5 | 24 | C1/0.05 | D1/10.2 | E1/10 | F1/10 | 30 | — | 6.7 | 22 | 842 | 32 | ○ |
| 16 | A1/0.16 | B3/0.1 | 13.6 | 83 | C1/0.05 | D1/10.2 | E1/10 | F1/10 | 30 | — | 6.7 | 17 | 315 | 66 | ○ |
| 17 | A1/0.16 | B3/0.6 | 13.6 | 83 | C1/0.05 | D1/10.2 | E1/10 | F1/10 | 30 | — | 6.7 | 21 | 784 | 85 | ○ |
| 18 | A1/0.16 | B3/0.6 | 13.6 | 83 | C1/0.05 | D1/10.2 | E1/10 | F1/10 | 30 | — | 6.7 | 20 | 701 | 65 | ○ |
| 19 | A1/0.16 | B1/1.5 | 12.8 | 32 | C1/0.05 | D1/10.2 | E1/5 | F1/10 | 30 | — | 6.7 | 19 | 454 | 35 | ○ |

TABLE 2

| Example | Anionic surfactant Type/content (g/L) | Nonionic surfactant Type/content (g/L) | HLB value | Cloud point (° C.) | Protection film-forming agent Type/content (g/L) | Oxidizing agent Type/content (g/L) | Etching agent Type/content (g/L) | Abrasive grains Type/content (g/L) | Average primary particle size (nm) | pH-controlling agent Type/content (g/L) | pH | Water contact angle | Stock removal rate (nm/min) | Dishing (nm) | Pot life |
|---|---|---|---|---|---|---|---|---|---|---|---|---|---|---|---|
| 20 | A1/0.16 | B1/1.5 | 12.8 | 32 | C1/0.02 | D1/10.2 | E1/10 | F1/10 | 30 | — | 6.7 | 23 | 216 | 61 | ○ |
| 21 | A1/0.16 | B1/3 | 12.8 | 32 | C1/0.2 | D1/10.2 | E1/10 | F1/10 | 30 | — | 6.7 | 13 | 236 | 50 | ○ |
| 22 | A2/0.16 | B1/1.5 | 12.8 | 32 | C1/0.05 | D1/10.2 | E1/10 | F1/10 | 30 | — | 6.7 | 20 | 209 | 26 | ○ |
| 23 | A3/0.16 | B1/1.5 | 12.8 | 32 | C1/0.05 | D1/10.2 | E1/10 | F1/10 | 30 | — | 6.5 | 25 | 576 | 30 | ○ |
| 24 | A4/0.16 | B1/1.5 | 12.8 | 32 | C1/0.05 | D1/10.2 | E1/10 | F1/10 | 30 | — | 6.6 | 23 | 877 | 45 | ○ |
| 25 | A5/0.16 | B1/1.5 | 12.8 | 32 | C1/0.05 | D1/10.2 | E1/10 | F1/10 | 30 | — | 6.9 | 25 | 690 | 37 | ○ |
| 26 | A6/0.16 | B1/1.5 | 12.8 | 32 | C1/0.05 | D1/10.2 | E1/10 | F1/10 | 30 | — | 6.7 | 20 | 893 | 31 | ○ |
| 27 | A7/0.04 | B1/1.5 | 12.8 | 32 | C1/0.05 | D1/10.2 | E1/10 | F1/10 | 30 | — | 6.9 | 24 | 259 | 20 | ○ |
| 28 | A8/0.02 | B1/1.5 | 12.8 | 32 | C1/0.05 | D1/10.2 | E1/10 | F1/10 | 30 | — | 7.8 | 35 | 459 | 32 | ○ |

TABLE 2-continued

| | Anionic surfactant | | Nonionic surfactant | | | Protection film-forming agent | Oxidizing agent | Etching agent | | Abrasive grains Average primary particle size (nm) | pH-controlling agent | pH | Water contact angle | Stock removal rate (nm/min) | Dishing (nm) | Pot life |
|---|---|---|---|---|---|---|---|---|---|---|---|---|---|---|---|---|
| | Type/ content (g/L) | | Type/ content (g/L) | HLB value | Cloud point (°C.) | Type/ content (g/L) | Type/ content (g/L) | Type/ content (g/L) | Type/ content (g/L) | | Type/ content (g/L) | | | | | |
| 29 | A9/ 0.05 | | B1/ 1.5 | 12.8 | 32 | C1/ 0.05 | D1/ 10.2 | E1/ 10 | F1/ 10 | 30 | — | 8.1 | 42 | 560 | 26 | ○ |
| 30 | A10/ 0.16 | | B1/ 1.5 | 12.8 | 32 | C1/ 0.05 | D1/ 10.2 | E1/ 10 | F1/ 10 | 30 | G1/ 0.5 | 9.8 | 23 | 545 | 51 | Δ |
| 31 | A10/ 0.16 | | B1/ 1.5 | 12.8 | 32 | C1/ 0.05 | D1/ 10.2 | E1/ 10 | F1/ 10 | 30 | G1/ 2.0 | 11.2 | 13 | 496 | 62 | Δ |
| Comparative Example | | | | | | | | | | | | | | | | |
| 1 | A1/ 0.16 | | — | — | — | C1/ 0.05 | D1/ 10.2 | E1/9 | F1/ 10 | 30 | — | 6.7 | 85 | 23 | — | — |
| 2 | A1/ 0.8 A4/ 0.8 | | — | — | — | C1/ 0.05 | D1/ 10.2 | E1/9 | F1/ 10 | 30 | — | 6.7 | 80 | 0 | — | — |
| 3 | — | | B1/ 1.5 | 12.8 | 32 | C1/ 0.05 | D1/ 10.2 | E1/9 | F1/ 10 | 30 | — | 6.7 | 9 | 980 | 276 | ○ |
| 4 | — | | — | — | — | C1/ 0.05 | D1/ 10.2 | E1/9 | F1/ 10 | 30 | — | 6.7 | 30 | 932 | 279 | ○ |

In the column for "anionic surfactant" in Tables 1 and 2, A1 represents polyoxyethylene lauryl ether ammonium sulfate wherein the average number of repeating oxyethylene units is 2, A2 represents polyoxyethylene lauryl ether triethanolamine sulfate wherein the average number of repeating oxyethylene units is 1.5, A3 represents polyoxyethylene lauryl ether ammonium sulfonate wherein the average number of repeating oxyethylene units is 2, A4 represents ammonium lauryl sulfate, A5 represents ammonium lauryl benzene sulfonate, A6 represents ammonium lauryl sulfate, A7 represents a polyoxyethylene alkyl phenyl ether phosphoric acid wherein the average number of repeating oxyethylene units is 4, A8 represents potassium oleate, A9 represents a polyoxyethylene alkyl ether potassium acetate wherein the average number of repeating oxyethylene units is 2, and A10 represents a polyoxyethylene lauryl ether ammonium acetate wherein the average number of repeating oxyethylene units is 2.

In the column for "nonionic surfactant" in Tables 1 and 2, B1 represents a polyoxyethylene alkyl ether wherein the average number of repeating oxyethylene units is 7, B2 represents a polyoxyethylene lauryl ether wherein the average number of repeating oxyethylene units is 4.2, and B3 represents a polyoxyethylene lauryl ether wherein the average number of repeating oxyethylene units is 9. Here, the carbon number of the alkyl group in the polyoxyethylene alkyl ether is from 12 to 14.

In the column for "protection layer-forming agent" in Tables 1 and 2, C1 represents benzotriazole.

In the column for "oxidizing agent" in Tables 1 and 2, D1 represents hydrogen peroxide.

In the column for "etching agent" in Tables 1 and 2, E1 represents glycine.

In the column for "abrasive grains" in Tables 1 and 2, F1 represents colloidal silica.

In the column for "pH-controlling agent" in Tables 1 and 2, G1 represents potassium hydroxide.

TABLE 3

| | |
|---|---|
| Polishing machine: | One side polishing machine for CMP, Mirra, manufactured by Applied Materials, Inc. |
| Polishing pad: | Laminated pad made of polyurethane, IC-1000/Suba IV, manufactured by Rohm and Haas Electronic Materials |
| Polishing pressure: | 2 psi (= about 13.8 kPa) |
| Table rotational speed: | 100 rpm |
| Feed rate of polishing composition: | 200 mL/min |
| Carrier rotational speed: | 100 rpm |

As shown in Tables 1 and 2, in Examples 1 to 31, practically satisfactory results were obtained with respect to each of the stock removal rate and the dishing. Whereas, in Comparative Examples 1 to 4, with respect to either one of the stock removal rate and the dishing, a practically satisfactory result was not obtained. In the columns for "dishing" and "pot life" in Comparative Examples 1 and 2, (−) means that the stock removal rate was so low that the measurement or evaluation was impossible.

The polishing composition according to the second embodiment of the present invention is prepared by mixing predetermined amounts of an anionic surfactant, a protection film-forming agent, and a nonionic surfactant, preferably together with predetermined amounts of an oxidizing agent, an etching agent and abrasive grains, with water, so that the pH would be from 2 to 9. Thus, the polishing composition of this embodiment comprises an anionic surfactant, a protection film-forming agent, a nonionic surfactant and water and preferably further contains an oxidizing agent, an etching agent and abrasive grains.

The anionic surfactant contained in the polishing is composition of this second embodiment has a function to be electrically adsorbed on the surface of the conductor layer 14 in a pH range of from neutral to acidic to form a protecting film. In the pH range of from neutral to acidic, the surface potential of the conductor layer 14 made of copper is positive. Therefore, an anion group as a hydrophilic portion of the anionic surfactant will be bonded to the surface of the conductor layer 14, and a hydrophobic portion of the anionic surfactant will be located at the side opposite to the surface of the conductor layer 14. Accordingly, the surface of the protection film by the anionic surfactant has hydrophobicity. Once the protection film by the anionic surfactant is formed on the surface of the conductor layer 14, the affinity between the abrasive grains and the surface of the conductor layer 14 by the polishing composition decreases. As a result, excessive removal of the inside portion of the conductor layer 14 will be suppressed, and dishing (see FIG. 2) will be suppressed.

The anionic surfactant contained in the polishing composition preferably contains at least one compound represented by the chemical formula R1-Y1' or R1-X1-Y1', wherein R1 is an alkyl group, an alkylphenyl group or an alkenyl group, X1 is a polyoxyethylene group, a polyoxypropylene group or a poly(oxyethylene-oxypropylene) group, and Y1' is a $SO_3M1$ group or a $SO_4M1$ group. M1 in the $SO_3M1$ group and the $SO_4M1$ group is a counter ion. The counter ion is not particularly limited and may, for example, be an ammonium cation, an amine cation or an alkali metal cation such as a lithium cation, a sodium cation or a potassium cation. Among them, with a view to improving the stock removal rate of the conductor layer 14 by the polishing composition, preferred is a potassium cation, an ammonium cation or an amine cation, more preferred is an ammonium cation or a triethanolamine cation, and most preferred is an ammonium cation.

The content of the anionic surfactant in the polishing composition has a close relation with the suppression of dishing and the stock removal rate. If it is too small, no adequate protection film to strongly suppress the excessive polishing of the conductor layer 14 will be formed on the surface of the conductor layer 14, whereby dishing may not be sufficiently suppressed. With a view to suppressing the dishing more strongly, the content of the anionic surfactant in the polishing composition is preferably at least 0.01 g/L, more preferably at least 0.03 g/L, further preferably at least 0.05 g/L, still further preferably at least 0.08 g/L, most preferably at least 0.1 g/L. On the other hand, if the content of the anionic surfactant in the polishing composition is too large, the protection film will be excessively formed on the surface of the conductor layer 14, whereby polishing of the conductor layer 14 will be suppressed too much. In order to maintain the stock removal rate of the conductor layer 14 by the polishing composition to be high, the content of the anionic surfactant in the polishing composition is preferably at most 10 g/L, more preferably at most 5 g/L, further preferably at most 1 g/L, still further preferably at most 0.5 g/L, most preferably at most 0.3 g/L.

When the anionic surfactant contained in the polishing composition contains a compound represented by the chemical formula R1-X1-Y1', the average number of repeating units in X1 has a close relation with metal corrosion at the wiring edge portion in the conductor layer 14. If it is too large, metal corrosion so-called slit is likely to occur at the wiring edge portion. With a view to suppressing metal corrosion at the wiring edge portion, the average number of repeating units in X1 is preferably at most 6, more preferably at most 4, most preferably at most 2.

The protection film-forming agent contained in the polishing composition of this embodiment has a function to be adsorbed on the surface of the conductor layer 14 to form a protection film. The surface of this protection film by this protection film-forming agent has hydrophobicity. Once the protection film by the protection film-forming agent is formed on the surface of the conductor layer 14, the affinity between the abrasive grains and the surface of the conductor layer 14 decreases, and the stock removal rate of the conductor layer 14 by the polishing composition decreases. As a result, excessive removal of the inside portion of the conductor layer 14 will be suppressed, whereby dishing will be suppressed.

The protection film-forming agent contained in the polishing composition may be benzotriazole or a benzotriazole derivative. The benzotriazole derivative is one having hydrogen atoms bonded to the five-membered ring of benzotriazole replaced by other atomic groups. With a view to suppressing dishing more strongly, the protection film-forming agent contained in the polishing composition is preferably benzotriazole. In the protection film by benzotriazole, the five-membered ring portion of benzotriazole is bonded to the surface of the conductor layer 14, and the benzene ring portion of benzotriazole is located at the side opposite to the surface of the conductor layer 14, and consequently, the surface has hydrophobicity.

In the protection film by a benzotriazole derivative, the five-membered ring portion of the benzotriazole derivative is bonded to the surface of the conductor layer 14, and the benzene ring portion of the benzotriazole derivative is located at the side opposite to the surface of the conductor layer 14, whereby the surface has hydrophobicity.

The content of the protection film-forming agent in the polishing composition has a close relation with the stock removal rate and the suppression of dishing. If it is too small, no adequate protection film to strongly suppress the excessive polishing of the conductor layer 14 will be formed on the surface of the conductor layer 14, whereby dishing may not be sufficiently suppressed. With a view to suppressing dishing more strongly, the content of the protection film-containing agent in the polishing composition is preferably at least 0.001 g/L, more preferably at least 0.01 g/L. On the other hand, if the content of the protection film-forming agent in the polishing composition is too large, the protection film will be formed excessively on the surface of the conductor layer 14, and polishing of the conductor layer 14 may be suppressed too much. In order to maintain the stock removal rate of the conductor layer 14 by the polishing composition to be high, the content of the protection film-forming agent in the polishing composition is preferably at most 1 g/L, more preferably at most 0.2 g/L.

The nonionic surfactant contained in the polishing composition of this embodiment has a function to be adsorbed on the hydrophobic surface of the protection film by the above anionic surfactant and the above protection film-forming agent, to form a protection film. A hydrophobic portion of the nonionic surfactant will be bonded to the hydrophobic surface of the protection film by the anionic surfactant and the protection film-forming agent, and a hydrophilic portion of the nonionic surfactant will be located at the side opposite to the hydrophobic surface of the protection film by the anionic surfactant and the protection film-forming agent. Therefore, the surface of the protection film by the nonionic surfactant formed on the hydrophobic surface of the protection film by the anionic surfactant and the protection film-forming agent, has hydrophilicity. Once the protection film by the nonionic surfactant is formed on the hydrophobic surface of the protection film by the anionic surfactant and the protection film-forming agent, the affinity between the abrasive grains and the surface of the conductor layer 14 will be improved, whereby the stock removal rate of the conductor layer 14 by the polishing composition will be improved. As a result, an excessive decrease in the stock removal rate of the conductor layer 14 by the polishing composition due to the use of the above anionic surfactant and the above protection film-forming agent, will be suppressed.

The nonionic surfactant contained in the polishing composition contains at least one nonionic surfactant represented by the chemical formula R2-X2 and having a HLB value of from 10 to 16. Here, R2 is an alkyl group, and X2 is a polyoxyethylene group, a polyoxypropylene group or a poly(oxyethylene-oxypropylene) group. The content of the nonionic surfactant in the polishing composition has a close relation with the suppression of the decrease of the stock removal rate and the suppression of dishing. If it is too small, the excessive decrease of the stock removal rate of the conductor layer 14 may not be strongly suppressed. With a view to suppressing the excessive decrease of the stock removal rate of the conductor layer 14, the content of the nonionic surfactant in the polishing composition is preferably at least 0.01 g/L, more preferably at least 0.05 g/L, further preferably at least 0.1 g/L, most preferably at least 0.3 g/L. On the other hand, if the content of the nonionic surfactant in the polishing composition is too large, the action to suppress dishing by the anionic surfactant and the protection film-forming agent is likely to be weak, whereby dishing is likely to occur. Further, the ability of the polishing composition to polish the conductor layer 14 may rather decrease. With a view to suppressing dishing more strongly, the content of the nonionic surfactant in the polishing composition is preferably at most 20 g/L, more preferably at most 10 g/L, further preferably at most 5 g/L, most preferably at most 3 g/L.

The nonionic surfactant contained in the polishing composition of this embodiment has a physical parameter so-called a cloud point. This cloud point has a close relation with the intensity of the corrosive action of the polishing composition. If the cloud point of the nonionic surfactant contained in the polishing composition is too high, the corrosive action of the polishing composition is likely to be excessively intensified. With a view to inhibiting the excessive increase of the corrosive action of the polishing composition, the cloud point of the nonionic surfactant contained in the polishing composition is preferably at most 90° C., more preferably at most 50° C., most preferably at most 35° C.

The average number of repeating units in X2 in the nonionic surfactant contained in the polishing composition, has a close relation with the solubility of the nonionic surfactant in water. If it is too small, the nonionic surfactant tends to be hardly soluble in water. With a view to increasing the solubility of the nonionic surfactant in water, the average number of repeating units in X2 is preferably at least 2, more preferably at least 3. On the other hand, if the average number of repeating units in X2 in the nonionic surfactant contained in the polishing composition is too large, metal corrosion is likely to occur at the wiring edge portion in the conductor layer 14. With a view to suppressing metal corrosion at the wiring edge portion, the average number of repeating units in X2 is preferably at most 20, more preferably at most 15, most preferably at most 10.

The HLB value of the nonionic surfactant contained in the polishing composition has a close relation with the suppression of the decrease of the stock removal rate and suppression of dishing. If it is too low, the excessive decrease of the stock removal rate of the conductor layer 14 may not so strongly be suppressed. With a view to suppressing the excessive decrease of the stock removal rate of the conductor layer 14 more strongly, the HLB value of the nonionic surfactant contained in the polishing composition is preferably at least 10, more preferably at least 10.5, further preferably at least 11, most preferably at least 11.5. On the other hand, if the HLB value of the nonionic surfactant contained in the polishing composition is too high, the action to suppress dishing by the anionic surfactant and the protection film-forming agent is likely to be weak, whereby dishing is likely to occur. With a view to suppressing dishing more strongly, the HLB value of the nonionic surfactant in the polishing composition is preferably at most 16, more preferably at most 15, further preferably at most 14, most preferably at most 13.5. Here, the HLB value of the nonionic surfactant may, for example, be obtained by a Griffin method.

The polishing composition of this embodiment preferably further contains an oxidizing agent. The oxidizing agent has a function to oxidize the conductor layer 14 and thus serves to improve the stock removal rate of the conductor layer 14 by the polishing composition. The oxidizing agent contained in the polishing composition may be a peroxide such as hydrogen peroxide or ammonium persulfate. With a view to reducing metal contamination of the conductor layer 14 attributable to an oxidizing agent, hydrogen peroxide is preferred.

If the content of the oxidizing agent in the polishing composition is too small, the stock removal rate of the conductor layer 14 by the polishing composition will not be substantially improved. With a view to improving the stock removal rate of the conductor layer 14 by the polishing composition substantially, the content of the oxidizing agent in the polishing composition is preferably at least 1 g/L, more preferably at least 3 g/L, most preferably at least 5 g/L. On the other hand, if the content of the oxidizing agent in the polishing composition is too large, the polishing ability of the polishing composition against the conductor layer 14 tends to be too high, whereby dishing is likely to occur. With a view to suppressing dishing more strongly, the content of the oxidizing agent in the polishing composition is preferably at most 30 g/L, more preferably at most 20 g/L, most preferably at most 15 g/L.

The polishing composition of this embodiment preferably further contains an etching agent. The etching agent has a function to etch the conductor layer 14 and serves to improve the stock removal rate of the conductor layer 14 by the polishing composition. The etching agent contained in the polishing composition may be an α-amino acid such as glycine, alanine or valine. With a view to improving the stock removal rate of the conductor layer 14 by the polishing composition more, glycine is preferred.

If the content of the etching agent in the polishing composition is too small, the stock removal rate of the conductor layer 14 by the polishing composition will not be substantially improved. With a view to improving the stock removal rate of the conductor layer 14 by the polishing composition substantially, the content of the etching agent in the polishing composition is preferably at least 0.5 g/L, more preferably at least 1 g/L, further preferably at least 3 g/L, most preferably at least 5 g/L. On the other hand, if the content of the etching agent in the polishing composition is too large, the polishing ability of the polishing composition against the conductor layer 14 tends to be too high, whereby dishing is likely to occur. With a view to suppressing dishing more strongly, the content of the etching agent in the polishing composition is preferably at most 50 g/L, more preferably at most 30 g/L, further preferably at most 20 g/L, most preferably at most 15 g/L.

The polishing composition of this embodiment preferably further contains abrasive grains. The abrasive grains play a role of mechanically polish the conductor layer 14 and serve to improve the stock removal rate of the conductor layer 14 by the polishing composition. The abrasive grains contained in the polishing composition may be silica. With a view to reducing surface defects of the conductor layer 14 after polishing, colloidal silica is preferred.

If the content of the abrasive grains in the polishing composition is too small, the stock removal rate of the conductor layer 14 by the polishing composition will not be substantially improved. With a view to improving the stock removal rate of the conductor layer 14 by the polishing composition substantially, the content of the abrasive grains in the polishing composition is preferably at least 0.5 g/L, more preferably at least 1 g/L, most preferably at least 5 g/L. On the other hand, if the content of the abrasive grains in the polishing composition is too large, the polishing ability of the polishing composition against the conductor layer 14 tends to be too high, whereby dishing is likely to occur. With a view to suppressing dishing more strongly, the content of the abrasive grains in the polishing composition is preferably at most 100 g/L, more preferably at most 50 g/L, most preferably at most 20 g/L.

If the average primary particle size of the abrasive grains contained in the polishing composition is too small, the stock removal rate of the conductor layer 14 by the polishing composition will not be substantially improved. With a view to improving the stock removal rate of the conductor layer 14 by the polishing composition substantially, the average primary particle size of the abrasive grains contained in the polishing composition is preferably at least 3 nm, more preferably at least 5 nm, most preferably at least 8 nm. On the other hand, if the average primary particle size of the abrasive grains contained in the polishing composition is too large, the abrasive grains tend to settle in the polishing composition. With a view to preventing such settlement of the abrasive grains, the average primary particle size of the abrasive grains contained in the polishing composition is preferably at most 200 nm, more preferably at most 100 nm, most preferably at most 50 nm. Here, the average primary particle size of the abrasive grains is calculated from the specific surface area of the abrasive grains, measured by a BET method.

The pH of the polishing composition of this embodiment has a close relation with the adsorption action of the anionic surfactant to the surface of the conductor layer 14. For this adsorption action to work efficiently, the pH of the polishing composition is required to be from about neutral to acidic. However, if is the pH of the polishing composition is in a strongly acidic range, substantial dishing will occur. Accordingly, the pH of the polishing composition is at least 2. Further, with a view to suppressing dishing more strongly, the pH of the polishing composition is preferably at least 4, more preferably at least 6. On the other hand, if the pH of the polishing composition is in an alkaline range, decomposition of an etching agent in the polishing composition is likely to occur as the time passes, and the pot life of the polishing composition substantially decreases. Therefore, the pH of the polishing composition is required to be at most 9. Further, if the pH of the polishing composition exceeds 9, formation of the protection film by the anionic surfactant is likely to be prevented. With a view to improving the pot life of the polishing composition, the pH of the polishing composition is preferably at most 8.5, more preferably at most 8.

According to this second embodiment of the present invention, the following merits can be obtained.

The polishing composition of this embodiment contains an anionic surfactant and a protection film-forming agent as components having a function to suppress dishing, and a nonionic surfactant as a component to suppress an excessive decrease of the stock removal rate of the conductor layer 14 by the polishing composition due to the use of the anionic surfactant and the protection film-forming agent. Therefore, the polishing composition of this embodiment can satisfy both the required performance relating to dishing and the required performance relating to the stock removal rate. Accordingly, the polishing composition of this embodiment is particularly useful for an application to polish the conductor layer 14 in a semiconductor wiring process.

The above embodiment may be modified as follows.

The polishing composition of the above embodiment may be prepared by diluting a concentrated stock solution before use.

To the polishing composition of the above embodiment, known additives such as a pH-controlling agent, an antiseptic and a defoaming agent may be added, as the case requires.

Now, Examples of the second embodiment of the present invention and Comparative Examples will be described.

Polishing compositions of Examples 32 to 57 and Comparative Examples 5 to 14 were prepared by mixing an anionic surfactant, a protection film-forming agent, a nonionic surfactant, an oxidizing agent, an etching agent, abrasive grains and a pH-controlling agent with water, as the case requires. The details of the anionic surfactant, the protection film-forming agent, the nonionic surfactant, the oxidizing agent, the etching agent, the abrasive grains and the pH-controlling agent in each polishing composition, and the pH of each polishing composition, are as shown in Tables 4 and 5.

In the column for "stock removal rate" in Tables 4 and 5, the stock removal rate is shown which was obtained when a copper blanket wafer having a diameter of 200 mm was polished under the polishing conditions as identified in Table 6 by means of each of the polishing compositions of Examples 32 to 57 and Comparative Examples 5 to 14. The stock removal rate was obtained by dividing the difference in thickness of each wafer as between before and after the polishing by the polishing time. For the measurement of the thickness of the wafer, a sheet resistance measuring apparatus "VR-120", manufactured by Kokusai Electric System Service Co., Ltd. was used.

In the column for "dishing" in Tables 4 and 5, the results of measurement of the dishing amount of a copper pattern wafer (854 mask pattern) of SEMATEC polished by means of each of the polishing compositions of Examples 32 to 57 and Comparative Examples 5 to 14, are shown. Specifically, the copper pattern wafer of SEMATEC comprises a barrier layer made of tantalum and a conductor layer made of copper and having a thickness of 1,000 nm sequentially formed on an insulator layer made of silicon dioxide and having trenches, and has an initial concave portion with a depth of 500 nm on the upper surface. This copper pattern wafer was preliminarily polished by means of a polishing material "PLANERLITE-7105" of FUJIMI INCORPORATED under the polishing conditions as identified in Table 6 until the thickness of the conductor layer became 300 nm, before polishing by means of each of the polishing compositions of Examples 32 to 57 and Comparative Examples 5 to 14. Then, by means of each of the polishing compositions of Examples 32 to 57 and Comparative Examples 5 to 14, the copper pattern wafer after the preliminary polishing, was polished under the polishing conditions as identified in Table 6 until the upper layer of the barrier layer exposed. Thereafter, by means of a profiler "HRP340" as a contact type surface measuring apparatus of KLA-Tencor Corporation, the dishing amount was measured at an area of each wafer where a trench with a width of 100 μm was independently formed.

In the column for "pot life" in Tables 4 and 5, the results of evaluation of the pot life of each of the polishing compositions of Examples 32 to 57 and Comparative Examples 5 to 14 are shown. Specifically, using each of the polishing compositions of Examples 32 to 57 and Comparative Examples 5 to 14 immediately after the preparation and each of the polishing compositions of Examples 32 to 57 and Comparative Examples 5 to 14 after being left to stand still for 14 days in a constant temperature tank of 25° C. after the preparation, respectively, copper blanket wafers were polished under the polishing conditions as identified in Table 3. And, the stock removal rate was calculated by dividing the difference in thickness of each wafer as between before and after the polishing by the polishing time, and the pot life of each polishing composition was evaluated, based on the comparison between the stock removal rate with the polishing composition immediately after the preparation and the stock removal rate with the polishing composition left to stand for 14 days at 25° C. In the column for "pot life", ◯ (good) means that the decrease in the stock removal rate was less than 5%, and Δ (slightly poor) means that the decrease in the stock removal rate was from 5 to 10%, and X (poor) means that the decrease in the stock removal rate was more than 10%.

In the column for "corrosiveness" in Tables 4 and 5, the results of evaluation of the intensity of the corrosive action of the each of polishing compositions of Examples 32 to 57 and Comparative Examples 5 to 14 are shown. Specifically, presence or absence of corrosion was observed by means of Review-SEM RS-400 of Hitachi High-Technologies Corporation, at the wiring edge portion of a wiring with a width of 0.25 μm in a copper pattern wafer of SEMATEC polished with each of the polishing compositions of Examples 32 to 57 and Comparative Examples 5 to 14. Based on the observation results, the intensity of the corrosive action of each polishing composition was evaluated. In the column for "corrosiveness", ◯ (good) means that no corrosion was observed, and X means that corrosion was observed.

TABLE 4

| Example | Anionic surfactant Type/content (g/L) | Protection film-forming agent Type/content (g/L) | Nonionic surfactant Type/content (g/L) | HLB value | Cloud point (°C.) | Oxidizing agent Type/content (g/L) | Etching agent Type/content (g/L) | Type/content (g/L) | Abrasive grains Average primary particle size (nm) | pH-controlling agent Type/content (g/L) | pH | Stock removal rate (nm/min) | Dishing (nm) | Pot life | Corrosiveness |
|---|---|---|---|---|---|---|---|---|---|---|---|---|---|---|---|
| 32 | A1/0.14 | B1/0.05 | C1/0.6 | 12.8 | 32 | D1/10.2 | E1/10 | F1/10 | 30 | — | 6.7 | 732 | 65 | ◯ | ◯ |
| 33 | A1/0.14 | B1/0.05 | C1/1.2 | 12.8 | 32 | D1/10.2 | E1/10 | F1/10 | 30 | — | 6.7 | 795 | 49 | ◯ | ◯ |
| 34 | A1/0.14 | B1/0.05 | C1/1.8 | 12.8 | 32 | D1/10.2 | E1/10 | F1/10 | 30 | — | 6.7 | 815 | 48 | ◯ | ◯ |
| 35 | A1/0.14 | B1/0.05 | C1/2.4 | 12.8 | 32 | D1/10.2 | E1/10 | F1/10 | 30 | — | 6.7 | 825 | 42 | ◯ | ◯ |
| 36 | A1/0.05 | B1/0.04 | C1/1.8 | 12.8 | 32 | D1/10.2 | E1/10 | F1/10 | 30 | — | 6.7 | 930 | 79 | ◯ | ◯ |
| 37 | A1/0.18 | B1/0.04 | C1/1.8 | 12.8 | 32 | D1/10.2 | E1/10 | F1/10 | 30 | — | 6.7 | 490 | 45 | ◯ | ◯ |
| 38 | A1/0.28 | B1/0.04 | C1/1.8 | 12.8 | 32 | D1/10.2 | E1/10 | F1/10 | 30 | — | 6.7 | 410 | 19 | ◯ | ◯ |
| 39 | A1/0.41 | B1/0.04 | C1/1.8 | 12.8 | 32 | D1/10.2 | E1/10 | F1/10 | 30 | — | 6.8 | 329 | 13 | ◯ | ◯ |
| 40 | A1/0.14 | B1/0.04 | C1/1.8 | 12.8 | 32 | D1/10.2 | E1/10 | F1/10 | 11 | — | 6.7 | 540 | 28 | ◯ | ◯ |
| 41 | A1/0.14 | B1/0.04 | C1/1.8 | 12.8 | 32 | D1/10.2 | E1/10 | F1/10 | 22 | — | 6.7 | 643 | 35 | ◯ | ◯ |
| 42 | A1/0.14 | B1/0.04 | C1/1.8 | 12.8 | 32 | D1/10.2 | E1/10 | F1/10 | 43 | — | 6.7 | 889 | 65 | ◯ | ◯ |
| 43 | A1/0.14 | B1/0.04 | C1/1.8 | 12.8 | 32 | D1/10.2 | E1/10 | F1/10 | 55 | — | 6.7 | 1090 | 75 | ◯ | ◯ |
| 44 | A1/0.28 | B1/0.05 | C1/1.2 | 12.8 | 32 | D1/10.2 | E1/10 | F1/10 | 30 | — | 6.7 | 683 | 49 | ◯ | ◯ |
| 45 | A1/0.14 | B1/0.05 | C2/0.3 | 11.5 | 24 | D1/10.2 | E1/10 | F1/10 | 30 | — | 6.7 | 518 | 49 | ◯ | ◯ |
| 46 | A1/0.28 | B1/0.05 | C2/1.8 | 11.5 | 24 | D1/10.2 | E1/10 | F1/10 | 30 | — | 6.7 | 852 | 32 | ◯ | ◯ |
| 47 | A1/0.14 | B1/0.05 | C3/0.1 | 13.6 | 83 | D1/10.2 | E1/10 | F1/10 | 30 | — | 6.7 | 316 | 67 | ◯ | ◯ |
| 48 | A1/0.14 | B1/0.05 | C3/0.6 | 13.6 | 83 | D1/10.2 | E1/10 | F1/10 | 30 | — | 6.7 | 767 | 86 | ◯ | ◯ |
| 49 | A1/0.28 | B1/0.05 | C3/0.6 | 13.6 | 83 | D1/10.2 | E1/10 | F1/10 | 30 | — | 6.7 | 698 | 66 | ◯ | ◯ |
| 50 | A1/0.14 | B1/0.05 | C1/1.8 | 12.8 | 32 | D1/10.2 | E1/5 | F1/10 | 30 | — | 6.7 | 446 | 34 | ◯ | ◯ |

TABLE 5

| | Anionic surfactant Type/content (g/L) | Protection film-forming agent Type/content (g/L) | Nonionic surfactant Type/content (g/L) | HLB value | Cloud point (°C.) | Oxidizing agent Type/content (g/L) | Etching agent Type/content (g/L) | Abrasive grains Type/content (g/L) | Average primary particle size (nm) | pH-controlling agent Type/content (g/L) | pH | Stock removal rate (nm/min) | Dishing (nm) | Pot life | Corrosiveness |
|---|---|---|---|---|---|---|---|---|---|---|---|---|---|---|---|
| Example | | | | | | | | | | | | | | | |
| 51 | A1/0.14 | B1/0.02 | C1/1.8 | 12.8 | 32 | D1/10.2 | E1/10 | F1/10 | 30 | — | 6.7 | 220 | 60 | ○ | ○ |
| 52 | A1/0.14 | B1/0.2 | C1/3 | 12.8 | 32 | D1/10.2 | E1/10 | F1/10 | 30 | — | 6.7 | 233 | 51 | ○ | ○ |
| 53 | A2/0.23 | B1/0.05 | C1/1.8 | 12.8 | 32 | D1/10.2 | E1/10 | F1/10 | 30 | — | 6.7 | 213 | 26 | ○ | ○ |
| 54 | A3/0.14 | B1/0.05 | C1/1.8 | 12.8 | 32 | D1/10.2 | E1/10 | F1/10 | 30 | — | 6.5 | 570 | 30 | ○ | ○ |
| 55 | A4/0.14 | B1/0.05 | C1/1.8 | 12.8 | 32 | D1/10.2 | E1/10 | F1/10 | 30 | — | 6.6 | 870 | 45 | ○ | ○ |
| 56 | A5/0.14 | B1/0.05 | C1/1.8 | 12.8 | 32 | D1/10.2 | E1/10 | F1/10 | 30 | — | 6.9 | 690 | 38 | ○ | ○ |
| 57 | A6/0.17 | B1/0.05 | C1/1.8 | 12.8 | 32 | D1/10.2 | E1/10 | F1/10 | 30 | — | 6.7 | 903 | 31 | ○ | ○ |
| Comparative Example | | | | | | | | | | | | | | | |
| 5 | A1/0.14 | B1/0.05 | — | — | — | D1/10.2 | E1/9 | F1/10 | 30 | — | 6.7 | 24 | — | — | — |
| 6 | — | B1/0.05 | C1/1.8 | 12.8 | 32 | D1/10.2 | E1/9 | F1/10 | 30 | — | 6.7 | 985 | 280 | ○ | ○ |
| 7 | — | B1/0.05 | — | — | — | D1/10.2 | E1/9 | F1/10 | 30 | — | 6.7 | 925 | 275 | ○ | ○ |
| 8 | A1/0.14 | — | C1/1.2 | 12.8 | 32 | D1/10.2 | E1/10 | F1/10 | 30 | — | 6.7 | 820 | 380 | ○ | ○ |
| 9 | A1/0.14 | B1/0.05 | C1/1.8 | 12.8 | 32 | D1/10.2 | E1/10 | F1/10 | 30 | G1/0.5 | 9.9 | 550 | 51 | × | ○ |
| 10 | A1/0.14 | B1/0.05 | C1/1.8 | 12.8 | 32 | D1/10.2 | E1/10 | F1/10 | 30 | G1/2.0 | 10.9 | 495 | 62 | × | ○ |
| 11 | A1/0.14 | B1/0.05 | C1/1.8 | 12.8 | 32 | D1/10.2 | E1/10 | F1/10 | 30 | G2/1.0 | 1.6 | 890 | 290 | Δ | × |
| 12 | A1/0.14 | B1/0.05 | C4/1.2 | 13 | Nil | D1/10.2 | E1/10 | F1/10 | 30 | — | 6.7 | 32 | — | — | — |
| 13 | A1/0.14 | B1/0.05 | C5/0.6 | 18.1 | >100 | D1/10.2 | E1/9 | F1/10 | 30 | — | 6.7 | 450 | 125 | ○ | × |
| 14 | A1/0.14 | B1/0.05 | C6/1.2 | 9.5 | * | D1/10.2 | E1/10 | F1/10 | 30 | — | 6.7 | 45 | — | — | — |

*Insoluble in water

In the column for "anionic surfactant" in Tables 4 and 5, A1 represents polyoxyethylene lauryl ether ammonium sulfate wherein the average number of repeating oxyethylene units is 2, A2 represents polyoxyethylene lauryl ether triethanolamine sulfate wherein the average number of repeating oxyethylene units is 1.5, A3 represents polyoxyethylene lauryl ether ammonium sulfonate wherein the average number of repeating oxyethylene units is 2, A4 represents ammonium lauryl sulfate, A5 represents ammonium lauryl benzene sulfonate, and A6 represents ammonium lauryl sulfate.

In the column for "protective film-forming agent" in Tables 4 and 5, B1 represents benzotriazole.

In the column for "nonionic surfactant" in Tables 4 and 5, C1 represents a polyoxyethylene alkyl ether wherein the average number of repeating oxyethylene units is 7, C2 represents polyoxyethylene lauryl ether wherein the average number of repeating oxyethylene units is 4.2, and C3 represents polyoxyethylene lauryl ether wherein the average number of repeating oxyethylene units is 9, C4 represents acetylene diol, C5 represents polyoxyethylene lauryl ether wherein the average number of repeating oxyethylene units is 30, and C6 represents polyoxyethylene lauryl ether wherein the average number of repeating oxyethylene units is 2. Here, the carbon number of the alkyl group in the polyoxyethylene alkyl ether is from 12 to 14.

In the column for "oxidizing agent" in Tables 4 and 5, D1 represents hydrogen peroxide.

In the column for "etching agent" in Tables 4 and 5, E1 represents glycine.

In the column for "abrasive grains" in Tables 4 and 5, F1 represents colloidal silica.

In the column for "pH-controlling agent" in Tables 4 and 5, G1 represents potassium hydroxide, and G2 represents nitric acid.

TABLE 6

| | |
|---|---|
| Polishing machine: | One side polishing machine for CMP, Mirra, manufactured by Applied Materials, Inc. |
| Polishing pad: | Laminated pad made of polyurethane, IC-1000/Suba IV, manufactured by Rohm and Haas Electronic Materials |
| Polishing pressure: | 2 psi (= about 13.8 kPa) |
| Table rotational speed: | 100 rpm |
| Feed rate of polishing composition: | 200 mL/min |
| Carrier rotational speed: | 100 rpm |

As shown in Tables 4 and 5, in Examples 32 to 57, practically satisfactory results were obtained with respect to each of the stock removal rate, the dishing, the pot life and the corrosiveness. Whereas, in Comparative Examples 5 to 14, practically satisfactory results were not obtained with respect to at least one of the stock removal rate, the dishing and the pot life. Further, (−) in the columns for "dishing", "pot life" and "corrosiveness" in Comparative Examples 5, 8, 9, 11, 15 and 17, means that the stock removal rate was so low that the measurement or evaluation was impossible.

The entire disclosures of Japanese Patent Application No. 2006-211453 filed on Aug. 2, 2006 and Japanese Patent Application No. 2006-211454 filed on Aug. 2, 2006 including specifications, claims, drawings and summaries are incorporated herein by reference in their entireties.

What is claimed is:

1. A polishing composition comprising a protection film forming agent, an anionic surfactant and a nonionic surfactant, wherein the composition has a pH of from 2 to 9 and wherein the anionic surfactant contains at least one compound represented by R1-X1-Y1, wherein R1 is an alkyl group, an alkylphenyl group or an alkenyl group, X1 is a polyoxyethylene group, a polyoxypropylene group or a poly(oxyethylene-oxypropylene) group, and Y1 is an anionic functional group, and wherein the composition is prepared so that the water contact angle of the surface of an object to be polished, after being polished by the composition, would be at most 60°, wherein the nonionic surfactant contains at least one compound represented by the chemical formula R2-X2, wherein R2 is an alkyl group, and X2 is a polyoxyethylene group, a polyoxypropylene group or a poly(oxyethylene-oxypropylene) group, and having a HLB value of from 10 to 16.

2. The polishing composition according to claim 1, wherein Y1 in the anionic surfactant is a residue of a carboxylic acid, phosphoric acid, phosphorous acid, sulfuric acid, sulfurous acid or a salt thereof.

3. The polishing composition according to claim 1, wherein the protection film forming agent is benzotriazole or a benzotriazole derivative.

4. The polishing composition according to claim 1, wherein the protection film forming agent is present in an amount of from 0.01 g/L to 0.2 g/L.

5. The polishing composition according to claim 1, which has a pH of from 6 to 8.

6. A polishing composition comprising a protection film forming agent, an anionic surfactant and polyoxyethylene alkyl ether, wherein the composition has a pH of from 2 to 9 and wherein the composition is prepared so that the water contact angle of the surface of an object to be polished, after being polished by the composition, would be at most 60°, wherein the anionic surfactant contains at least one compound represented by the chemical formula R1-Y1 or R1-X1-Y1, wherein R1 is an alkyl group, an alkylphenyl group or an alkenyl group, X1 is a polyoxyethylene group, a polyoxypropylene group or a poly(oxyethylene-oxypropylene) group, and Y1 is an anionic functional group.

7. The polishing composition according to claim 6, wherein Y1 in the anionic surfactant is a residue of a carboxylic acid, phosphoric acid, phosphorous acid, sulfuric acid, sulfurous acid or a salt thereof.

8. The polishing composition according to claim 6, wherein the polyoxyethylene alkyl ether has a HLB value of from 10 to 16.

9. A polishing composition comprising a protection film forming agent, an anionic surfactant and polyoxyethylene alkyl ether, wherein the composition has a pH of from 2 to 9 and wherein the anionic surfactant contains at least one compound represented by R1-X1-Y1, wherein R1 is an alkyl group, an alkylphenyl group or an alkenyl group, X1 is a polyoxyethylene group, a polyoxypropylene group or a poly(oxyethylene-oxypropylene) group, and Y1 is an anionic functional group, and wherein the composition is prepared so that the water contact angle of the surface of an object to be polished, after being polished by the composition, would be at most 60°.

10. The polishing composition according to claim 9, further comprising a nonionic surfactant which contains at least one compound represented by the chemical formula R2-X2, wherein R2 is an alkyl group, and X2 is a polyoxyethylene group, a polyoxypropylene group or a poly(oxyethylene-oxypropylene) group, and having a HLB value of from 10 to 16.

11. The polishing composition according to claim 10, wherein Y1 in the anionic surfactant is a residue of a carboxylic acid, phosphoric acid, phosphorous acid, sulfuric acid, sulfurous acid or a salt thereof.

12. The polishing composition according to claim 10, wherein the polyoxyethylene alkyl ether has a HLB value of from 10 to 16.

13. A polishing composition comprising a protection film forming agent, an anionic surfactant and a nonionic surfactant, wherein the composition has a pH of from 2 to 9 and wherein the anionic surfactant contains at least one compound represented by R1-X1-Y1, wherein R1 is an alkyl group, an alkylphenyl group or an alkenyl group, X1 is a polyoxyethylene group, a polyoxypropylene group or a poly(oxyethylene-oxypropylene) group, and Y1 is an anionic functional group, and wherein the composition is prepared so that the water contact angle of the surface of an object to be polished, after being polished by the composition, would be at most 60°, wherein the protection film forming agent is present in an amount of from 0.001 g/L to 1 g/L.

* * * * *